United States Patent
Kouwa et al.

[11] Patent Number: 6,005,372
[45] Date of Patent: Dec. 21, 1999

[54] VEHICLE GENERATOR CONTROLLER

[75] Inventors: Tatsuki Kouwa; Keiichi Komurasaki; Hirofumi Watanabe, all of Tokyo, Japan

[73] Assignee: Mitsubshiki Denki Kabsuhiki Kaisha, Tokyo, Japan

[21] Appl. No.: 08/980,280

[22] Filed: Nov. 28, 1997

[30] Foreign Application Priority Data

May 13, 1997 [JP] Japan .................................. 9-122615

[51] Int. Cl.⁶ .................................................. H02J 7/14
[52] U.S. Cl. .............................. 322/25; 322/28; 320/104
[58] Field of Search .................................. 322/22, 24, 25, 322/27, 28; 320/104, 137, 103, 123

[56] References Cited

U.S. PATENT DOCUMENTS

| | | | |
|---|---|---|---|
| 4,651,081 | 3/1987 | Nishimura et al. | 320/64 |
| 4,680,529 | 7/1987 | Komurasaki et al. | 322/28 |
| 4,831,322 | 5/1989 | Mashino et al. | 322/28 |
| 4,839,576 | 6/1989 | Kaneyuki et al. | 322/25 |
| 5,140,253 | 8/1992 | Itoh | 322/28 |
| 5,157,321 | 10/1992 | Kato et al. | 322/28 |
| 5,497,071 | 3/1996 | Iwatani et al. | 322/28 |
| 5,886,500 | 3/1999 | Iwatani et al. | 320/104 |

FOREIGN PATENT DOCUMENTS

| | | |
|---|---|---|
| 201 243 | 12/1986 | European Pat. Off. . |
| 339 576 | 11/1989 | European Pat. Off. . |
| 430 203 | 6/1991 | European Pat. Off. . |
| 430 208 | 6/1991 | European Pat. Off. . |
| 438 884 | 7/1991 | European Pat. Off. . |
| 545 616 | 6/1993 | European Pat. Off. . |
| 751 602 | 1/1997 | European Pat. Off. . |
| 43 06 489 | 12/1993 | Germany . |
| 64-34900 | 3/1989 | Japan . |
| 2-32726 | 2/1990 | Japan . |

*Primary Examiner*—N. Ponomarenko
*Attorney, Agent, or Firm*—Sughrue, Mion, Zinn, Macpeak & Seas, PLLC

[57] ABSTRACT

A vehicle generator controller for regulating the output voltage from a generator which charges a battery mounted on a vehicle comprises battery voltage detection means for detecting the drop of a battery voltage, a switching element for controlling the field current of the generator, gradual increase control means for gradually increasing the current generated by the generator by gradually increasing the switching element by intermittently operating the switching element when the battery voltage drops and gradual increase prohibition means for canceling the gradual increase control at the beginning of the drop of the battery voltage and gradually increases the field current after the conducting ratio of the switching element is set to 100%. With this arrangement, the vehicle generator controller suppresses a torque shock caused in response to the turn-on of an electric load as well as sufficiently suppresses the drop of a battery voltage.

6 Claims, 6 Drawing Sheets

VEHICLE GENERATOR CONTROLLER

BACKGROUND OF THE INVENTION

1. Field of the Invention

The present invention relates to a vehicle generator controller for gradually increasing the current generated by a generator by gradually increasing a field current by intermittently operating a switching element when a battery voltage is dropped by the impose of an electric load, and more specifically, to a vehicle generator controller by which the drop of the battery voltage is sufficiently suppressed when the electric load is turned on.

2. Description of the Related Art

Conventionally, in a vehicle generator controller, since a torque shock is caused when a generated current is increased in instant response to the drop of a battery voltage, the current generated by a generator is gradually increased by gradually increasing a field current by the gradual increase of a conducting ratio (duty) executed by the intermittent operation of a switching element.

Figure 4:
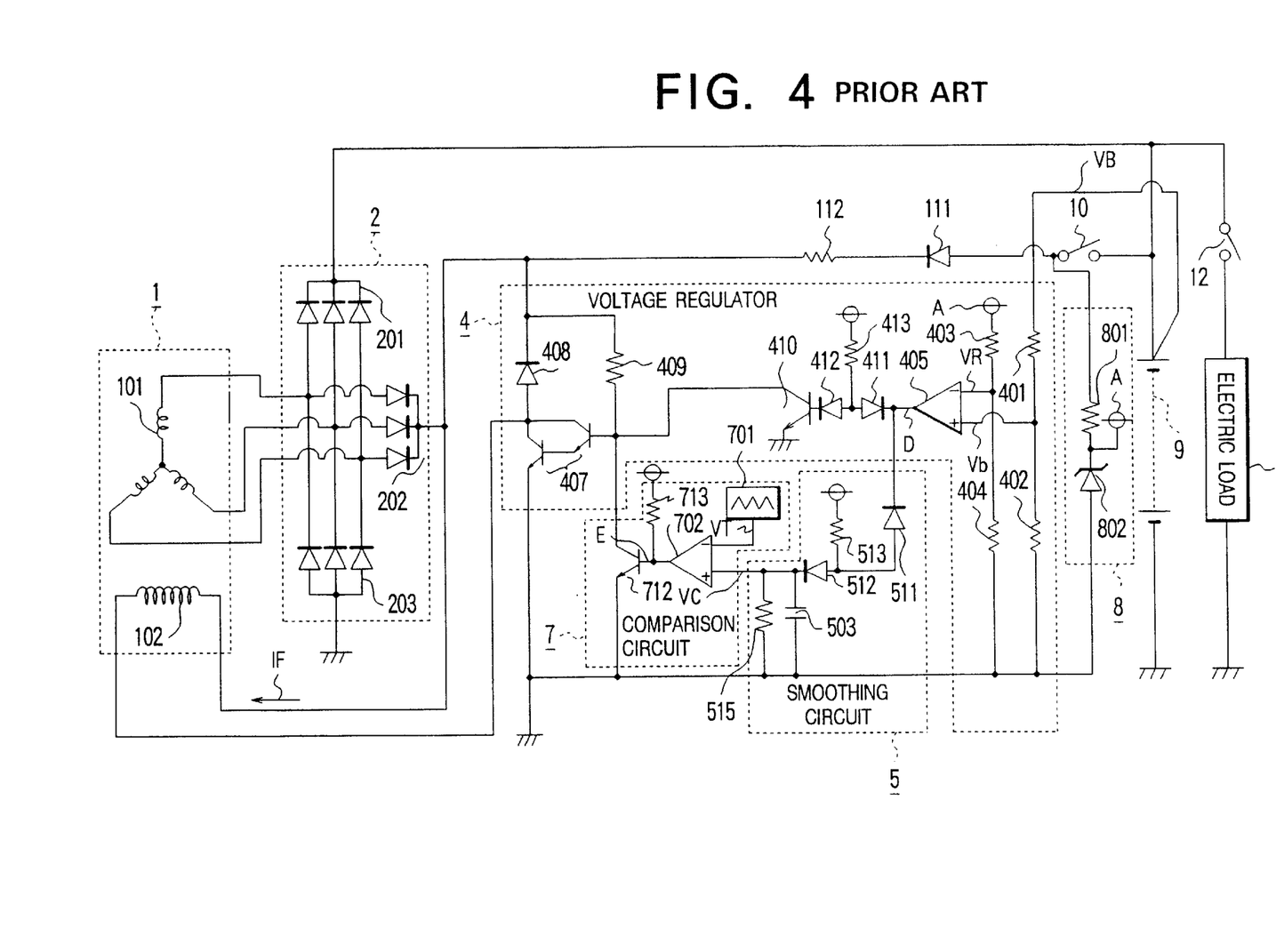
FIG. 4 is a circuit diagram showing a conventional vehicle generator controller.

FIG. 4 is a circuit diagram showing a conventional vehicle generator controller disclosed in U.S. Pat. No. 5,886,500.

In the drawing, a generator 1 driven by an internal combustion engine (not shown) includes an armature coil 101 and a field coil 102 and is mounted on a vehicle.

The rectifier 2 of the generator 1 for subjecting the ac output from the generator 1 to full wave rectification includes an output terminal 201 acting as a main output terminal, an output terminal 202 for exciting the field coil 102 and an output terminal 203 for the ground.

A controller for controlling the field current IF (generated current) of the generator 1 is composed of a voltage regulator 4 for regulating the output voltage (battery voltage VB) from the generator 1 to a predetermined value, a smoothing circuit 5 for smoothing the voltage detecting signal D of the battery voltage, a comparison circuit 7 operating in response to the output signal level from the smoothing circuit 5 and a constant voltage power supply circuit 8 for creating a constant power source A.

The smoothing circuit 5 and the comparison circuit 7 constitute a gradual increase control circuit for gradually increasing the field current IF of the generator 1 when the battery voltage VB drops.

A battery 9 mounted on the vehicle is charged by the output created by the generator 1 and rectified through the rectifier 2. A key switch 10 is connected to an end of the battery 9. The electric load 11 of the vehicle such as head lights, an air conditioner and the like is connected between both the ends of the battery 9. A switch 12 for imposing the electric load 11 is inserted between an end of the electric load 11 and one of the ends the battery 9.

The voltage regulator 4 includes resistors 401, 402 for creating a detected voltage Vb by dividing the voltage VB of the battery 9, resistors 403, 404 for creating a reference voltage VR by dividing the constant power source A, a comparator 405 for outputting a voltage detection signal D by comparing the detected voltage Vb with the reference voltage VR, an emitter-grounded transistor 407 inserted to the field coil 102 in series therewith for intermittently controlling the field current IF, a diode 408 for absorbing the surge caused by the intermittent operation of the transistor 407 and a resistor 409 inserted between the base of the transistor 407 and the collector thereof.

The voltage regulator 4 includes an emitter-grounded transistor 410 having a collector connected to the base of the transistor 407, a pair of diodes 411, 412 inserted in series between the output terminal of the comparator 405 and the base of the transistor 410 in inverted polarity and a resistor 413 inserted between the constant power source A and the point where diode 411 is connected to the diode 412.

The smoothing circuit 5 includes a pair of diodes 511, 512 connected in series to the output terminal of the comparator 405 in inverted polarity, a charging resistor 513 inserted between the constant power source A and the point where the diode 511 is connected to the diode 512, a capacitor 503 inserted between the cathode of the diode 512 and the ground and a discharging resistor 515 connected in parallel with the capacitor 503.

The comparison circuit 7 includes a triangle generator 701 for creating a triangle voltage VT, a comparator 702 for outputting a gradual increase control signal E by comparing the voltage VC of the capacitor 503 with the triangle voltage VT, an emitter-grounded transistor 712 inserted between the base of the transistor 407 and the ground and a resistor 713 inserted between the point where the base of the transistor 712 is connected to the output terminal of the comparator 702 and the constant power source A.

With this arrangement, the comparison circuit 7 gradually increases the field current IF by intermittently operating the transistor 407 to thereby gradually increase the current generated by the generator 1.

The gradual increase control signal E which is output from the comparator 702 gradually increases the conducting duty of the transistor 407 in response to the voltage which is output from the smoothing circuit 5, that is, to the capacitor 503 voltage VC to thereby gradually increase the field current IF.

A series circuit composed of a diode 111 and an initially exciting resistor 112 is inserted between the key switch 10 and an end of the field coil 102.

The constant voltage power supply circuit 8 is composed of a series circuit inserted between the key switch 10 and the ground and including a pull-up resistor 801 and a Zener diode 802.

With this arrangement, when the key switch 10 is turned on, the constant power source A is created from the point where the pull-up resistor 801 is connected to the Zener diode 802 based on the battery voltage VB.

Next, operation of the conventional vehicle generator controller shown in FIG. 4 will be described with reference to the waveform view of FIG. 5.

First, when the key switch 10 is turned on, the battery voltage VB of the battery 9 is turned on the Zener diode 802 through the resistor 801 and the constant power source A which is clamped by the Zener diode 802 is created from the point where the resistor 801 is connected to the Zener diode 802.

With this operation, although the controller of the generator 1 is made to an operable state, since the generator 1 does not yet start power generation, the signal level on the non-inverting input terminal (+) side of the comparator 405 in the voltage regulator 4 is lower than the reference voltage VR on the inverting terminal (−) thereof and accordingly the comparator 405 outputs the voltage detection signal D of a level.

At the time, since the capacitor 503 in the smoothing circuit 5 is not charged, the voltage VC has a zero potential. Therefore, the signal level on the non-inverting input terminal (+) side of the comparator 702 in the comparison circuit 7 is lower than a triangle voltage VT and the gradual increase control signal E is fixed to a low level and the transistor 712 remains in an off-state.

Consequently, the transistor 407 is turned on and the field current IF flows to the field coil 102 to thereby put the generator 1 to a power generation possible state.

When the internal combustion engine starts operation and the generator 1 starts power generation by being driven by the internal combustion engine, the signal level on the non-inverting input terminal (+) side of the comparator 405 in the voltage regulator 4 is increased by the increase of the battery voltage VB. When the signal level on the non-inverting input terminal (+) side becomes higher than the reference voltage VR, the voltage detection signal D is switched from the low level to a high level and the transistor 407 is switched from a conducting state to a shut-off state.

As described above, the voltage regulator 4 detects the battery voltage VB at all times and when, for example, it detects the drop of the battery voltage VB, it increases the conducting ratio of the transistor 407 through the comparator 702.

Since the field current IF is increased by the increase of the conducting ratio of the transistor 407 and the battery 9 is charged by the increase of the output from the generator 1, the battery voltage VB is controlled to a constant rated voltage.

When, for example, the switch 12 is turned on and the electric load 11 is turned on, the comparator 702 is operated and the field current IF is increased by the drop of the battery voltage VB.

Figure 5:
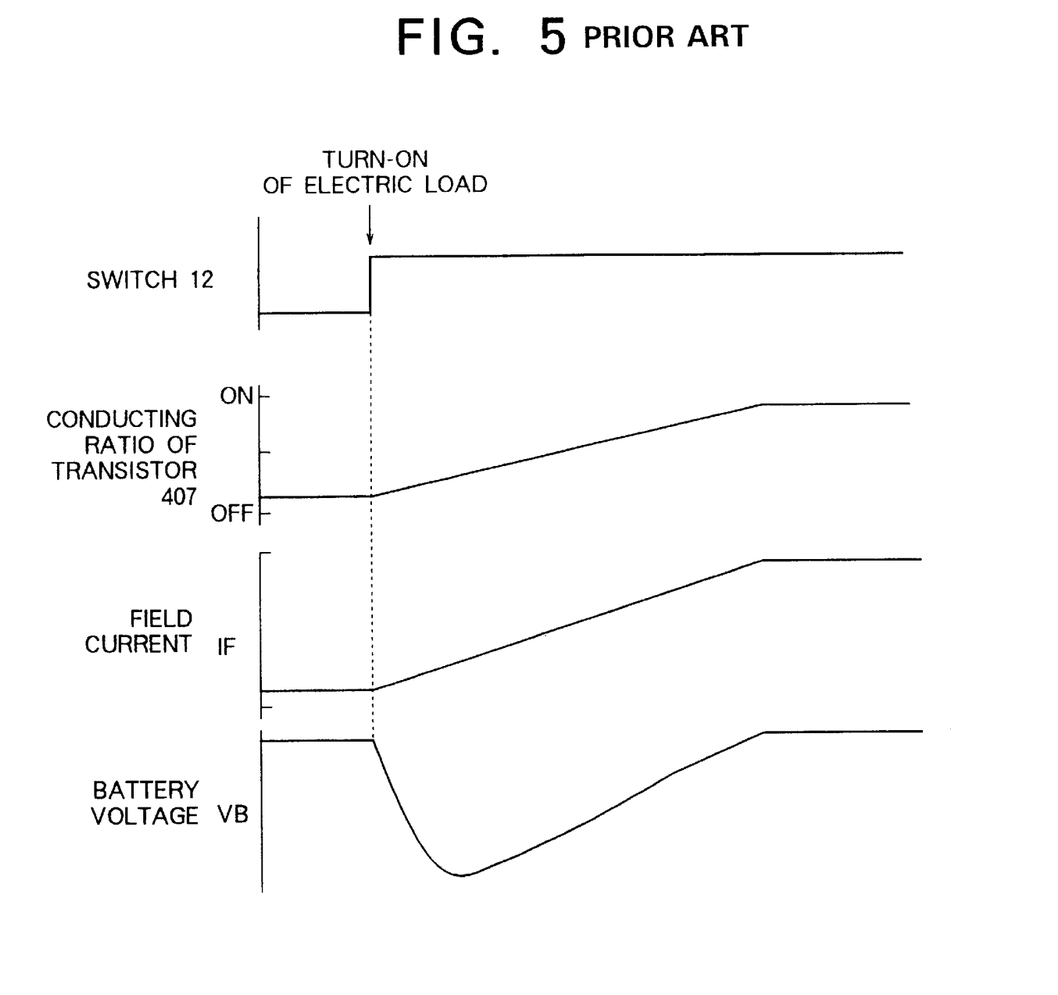

At the time, although the comparator 405 which responds to the battery voltage VB creates the voltage detection signal D of a low level by increasing the conducting duty of the field current IF, since the discharging time constant of the smoothing circuit 5 is set longer than the charging time constant thereof, the comparator 702 in the comparison circuit 7 increases the conducting ratio of the transistor 407 so as to gradually increase the duty as shown in FIG. 5.

Therefore, the field current IF gradually increase as the conducting ratio of the transistor 407 increases so that the output from the generator 1 gradually increases while suppressing a response shock.

However, when the gradual increase control is simply executed just after the electric load 11 is turned on, the voltage drop caused by the supply of the power to the electric load 11 cannot be instantly compensated.

As are result, the battery voltage VB greatly drops just after the electric load 11 is turned on as shown in FIG. 5 and the quantity of light of, for example, head lights is lowered, which makes the driver uncomfortable.

To suppress the drop of the battery voltage VB, there is proposed a technology for increasing the conducting ratio of the transistor 407 to a predetermined value $\alpha\%$ (about 10%) before the start of the gradual increase control as disclosed in, for example, Japanese Unexamined Patent Publication No. 2-32726.

Figure 6:
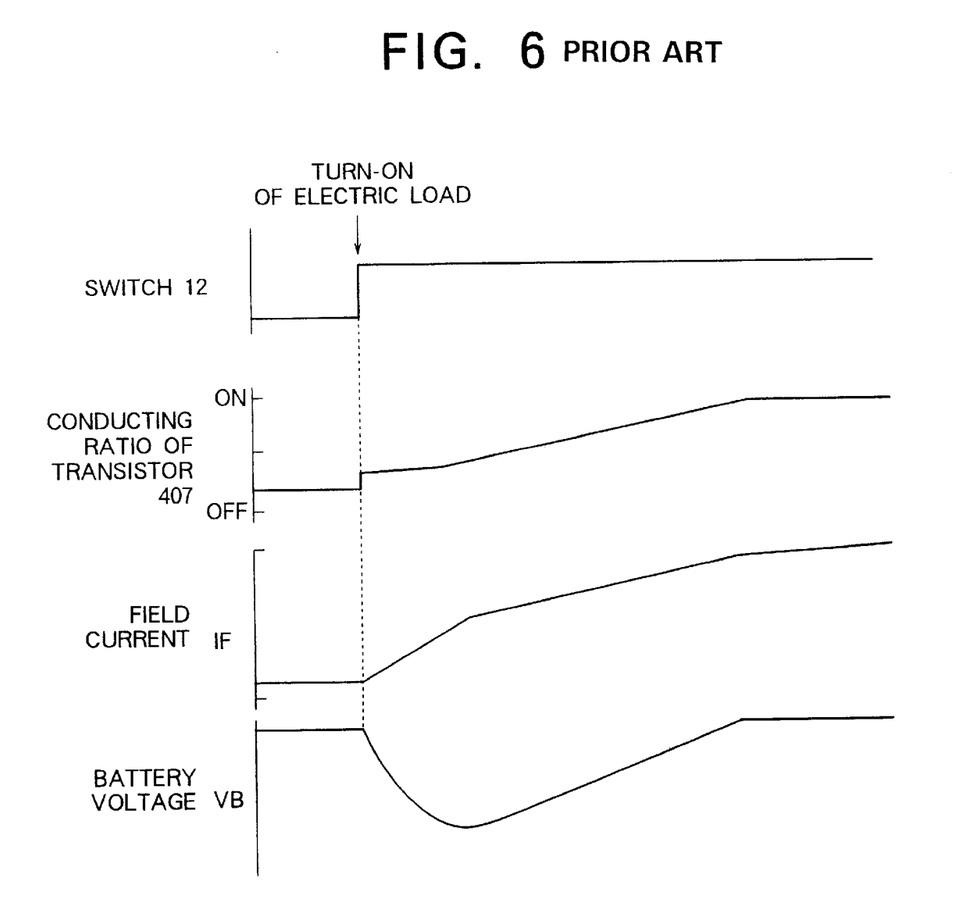

FIG. 6 is a waveform view when the conducting ratio is increased to the predetermined value ($\alpha\%$) just before the gradual increase control.

In this case, the switching duty (conducting ratio) for intermittently controlling the field current IF is not gradually increased from 0% but it is abruptly increased to $\alpha\%$ (about 10%) in order to that the field current IF (generated current) is increased at an inclination faster than that in a gradually increasing time and thereafter gradually increased at a certain inclination.

With this operation, although the drop of the battery voltage VB is suppressed to some degree, since the conducting ratio is set to the relatively low value of $\alpha\%$ (about 10%) at the beginning of the control, the insufficient charge of the battery 9 cannot be sufficiently compensated.

Further, since a certain degree of delay is caused during a time until the generated current is increased by $\alpha\%$ as compared with a controller in which the field current IF is not gradually increased, the drop of the battery voltage VB is also increased.

As described above, the conventional vehicle generator controller, which simply gradually increases the generated current when the electric load is turned on, has a problem that the battery voltage VB greatly decreases at the beginning of the control, which makes the driver uncomfortable.

Further, the conventional vehicle generator controller, which increases the generated current (corresponding to the field current IF) to $\alpha\%$ (about 10%) at the inclination faster than that when it is gradually increased before the field current IF is gradually increased at the certain inclination when the electric load is turned on, has a problem that the battery voltage VB also greatly drops because the insufficient charge of the battery is not sufficiently compensated although the drop of the battery voltage VB is slightly suppressed.

An object of the present invention made to solve the above problems is to provide a vehicle generator controller which suppresses a response torque shock caused when an electric load is turned on as well as sufficiently suppresses the drop of a battery voltage.

SUMMARY OF THE INVENTION

A vehicle generator controller according to the present invention for regulating a voltage output by a generator for charging a battery mounted on a vehicle comprises battery voltage detection means for detecting the drop of the voltage of the battery; a switching element for controlling the field current of the generator; gradual increase control means for gradually increasing the field current by intermittently operating the switching element when the battery voltage is lowered to thereby gradually increasing the current generated by the generator; and gradual increase prohibition means for outputting a conducing signal for canceling the gradual increase control at the beginning of the drop of the battery voltage, wherein when the battery voltage drops, the conducting ratio of the switching element is set to 100% and thereafter the field current is gradually increased.

The gradual increase prohibition means of the vehicle generator controller according to the present invention includes a conducting time measurement circuit for measuring the conducting time of the field current and gradually increases the field current after a predetermined time elapses from the time the conducting ratio of the switching element is set to 100%.

The conducting time measurement circuit of the vehicle generator controller according to the present invention includes a time constant circuit for setting the predetermined time which is set to the range of 20 milliseconds to 50 milliseconds.

The vehicle generator controller according to the present invention comprises a NOR circuit for opening and closing the switching element in response to the AND of the respective output signals from the battery voltage detection means and the gradual increase control means, wherein the battery voltage detection means includes a first comparator circuit for outputting a first level signal when the battery voltage drops below a first reference voltage; the gradual increase control means includes a second comparator circuit having a smoothing circuit for gradually increasing the conducting ratio of the switching element in response to the first level signal from the first comparator circuit and an AND circuit for calculating the AND of the respective output signals from the second comparator circuit and the gradual increase prohibition means; and the gradual increase prohibition means includes a third comparator circuit for outputting a second level conducting signal when the output signal from the conducting time measurement circuit reaches a second reference voltage; wherein the output signal from the conducting time measurement circuit moves to the second reference voltage according to the time constant of the time constant circuit in response to the first level signal from the first comparator circuit; and the third comparator circuit outputs a first level conducting signal over the predetermined time from the time when the battery voltage drops and sets the conducting ratio of the switching element to 100% through the NOR circuit by canceling the output signal from the second comparator through the NOR circuit.

The gradual increase prohibition circuit of the vehicle generator controller according to the present invention includes a field current detection circuit for detecting the field current; and an increased amount detection circuit for outputting the conducting signal as well as detecting an increased amount larger than the predetermined value of the field current and when the battery voltage drops, the field current detection circuit detects that the field current has been increased by a predetermined value after the conducting ratio of the switching element is set to 100% and thereafter the field current is gradually increased.

The increased amount detection circuit of the vehicle generator controller according to the present invention operates only when the battery voltage drops below the reference voltage and outputs the second level conducting signal when the increased amount of the field current reaches a value larger than the predetermined value after it maintains the conducting signal time interval to the first level, and the switching element increases the field current at the conducting ratio of 100% in response to the first level conducting signal and gradually increases the field current in response to the second level conducting signal.

BRIEF DESCRIPTION OF THE DRAWINGS

FIG. 2 is a waveform view explaining operation of the embodiment 1 of the present invention when an electric load is turned on;

FIG. 5 is a waveform view explaining operation of the conventional vehicle generator controller when an electric load is turned on; and FIG. 6 is a waveform view explaining operation of another conventional vehicle generator controller when an electric load is turned on.

DESCRIPTION OF THE PREFERRED EMBODIMENTS

Embodiment 1

Figure 1:
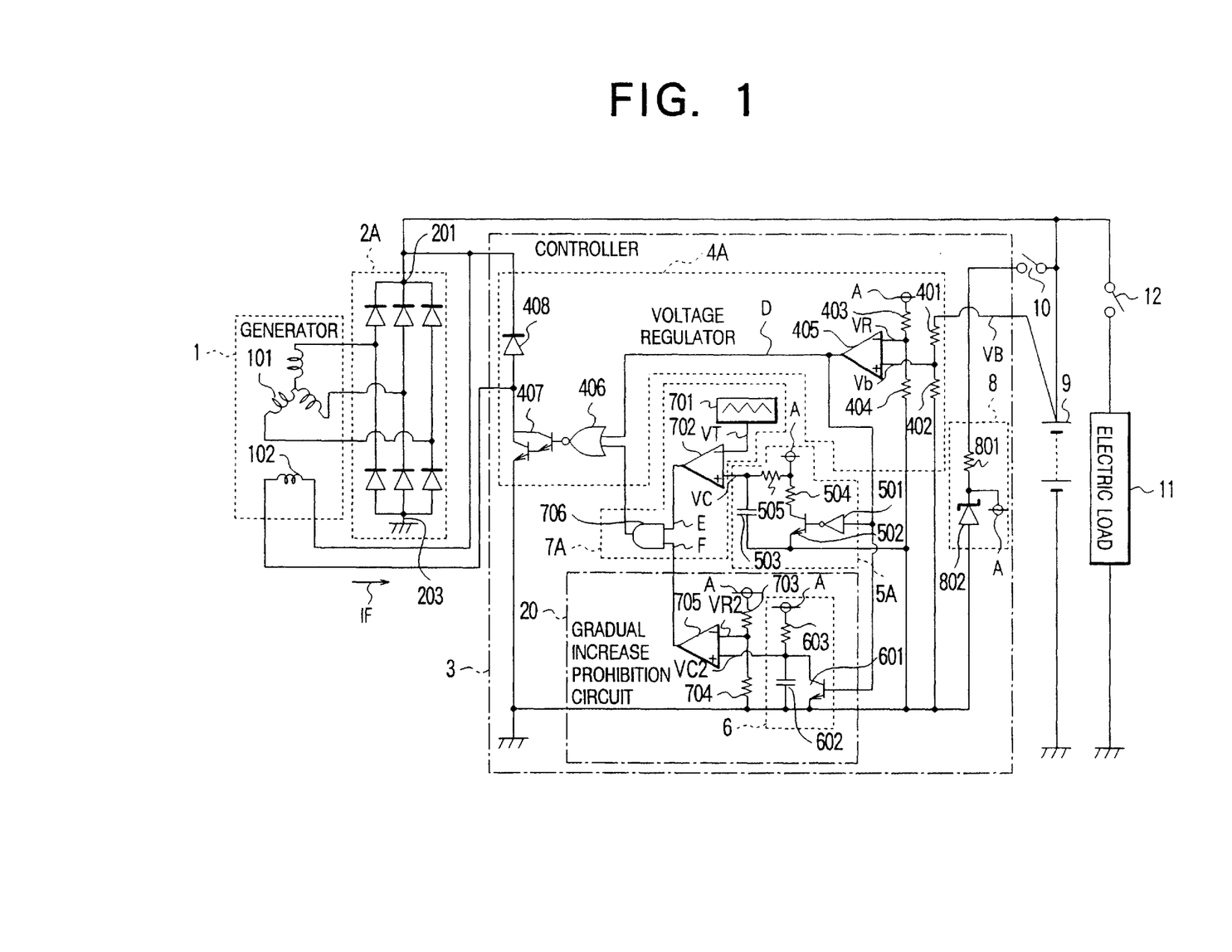
FIG. 1 is a circuit diagram showing an embodiment 1 of the present invention.

An embodiment 1 of the present invention will be described below with reference to the drawings. FIG. 1 is a circuit diagram showing the embodiment 1 of the present invention, wherein the same arrangements as those mentioned above (see FIG. 4) are denoted by the same numerals and the description thereof is not made in detail here.

In FIG. 1, the main output terminal 201 of a rectifier 2A also acts as an output terminal for exiting a field coil 102, by which the series circuit composed of the diode 111 and the resistor 112 in FIG. 4 is omitted.

In this case, a controller 3 for controlling the current generated by a generator 1 includes a gradual increase prohibition circuit 20 (gradual increase prohibition means) for canceling a gradual increase control at the beginning of the detection of the drop of a battery voltage VB, in addition to a voltage regulator 4A, a smoothing circuit 5A, a comparison circuit 7A and a constant voltage power supply circuit 8 which are mentioned above.

The smoothing circuit 5A and the comparison circuit 7A constitute a gradual increase control circuit (gradual increase control means) likewise the above mentioned.

The voltage regulator 4A includes a NOR circuit 406 inserted between the output terminal of a comparator 405 and the base of a transistor 407, in addition to resistors 401–404, the comparator 405, the transistor 407 and a diode 408 which are mentioned above.

The smoothing circuit 5A includes an inverter circuit 501 connected to the output terminal of the comparator 405, an emitter-grounded transistor 502 having a base connected to the output terminal of the inverter circuit 501, a resistor 504 inserted between a constant power source A and the collector of a transistor 502 and a resistor 505 inserted between the constant power source A and an end of a capacitor 503, in addition to the capacitor 503 mentioned above.

The inverter circuit 501 inverts a voltage detection signal D and the transistor 502 executes switching operation in synchronism with the output signal from the inverter circuit 501. The capacitor 503 is charged and discharged by the switching of the transistor 502 and the resistors 504 and 505 determine the charging/discharging time constant of the capacitor 503.

The gradual increase prohibition circuit 20 includes a conducting time measurement circuit 6 for measuring the conducting time of a field current IF and the conducting time measurement circuit 6 includes an emitter-grounded transistor 601 having a base connected to the output terminal of the comparator 405, a capacitor 602 inserted between the collector of the transistor 601 and the emitter thereof and a resistor 603 inserted between the constant power source A and the collector of the transistor 601.

The gradual increase prohibition circuit 20 includes resistors 703 and 704 inserted in series between the constant power source A and the ground and a comparator 705 having an inverting input terminal (−) connected to the point where the resistor 703 is connected to the resistor 704 and a non-inverting input terminal (+) connected to an end of the capacitor 602.

The transistor 601 is switched in synchronism with the voltage detection signal D and the capacitor 602 is charged and discharged by the intermittent operation of the transistor 601.

The resistor 603 constitutes a time constant circuit together with the capacitor 602 and determines the charging time constant of the capacitor 602.

The resistors 703 and 704 divide the voltage of the constant power source A and creates a reference voltage VR2.

The comparator 705 compares the voltage VC2 of the capacitor 602 with the reference voltage VR2 and when the voltage VC2 of the capacitor 602 is lower than the reference voltage VR2, the comparator 705 outputs a conducting signal F of a low level, whereas when the voltage VC2 of the capacitor 602 reaches the reference VR2, the comparator 705 outputs the conducting signal F of a high level.

The comparison circuit 7A including an AND circuit 706 for ANDing the gradual increase control signal E from the comparator 702 with the conducting signal F from the comparator 705, in addition to the triangle generator 701 and the comparator 702 which are mentioned above. The AND circuit 706 inputs the result of calculation of the AND to the NOR circuit 406.

Next, voltage regulating operation executed by the embodiment 1 of the present invention shown in FIG. 1 will be described.

First, when a key switch 10 is turned on, the constant power source A is created by the constant voltage power supply circuit 8 likewise the mentioned above and the controller 3 is made to an operable state.

At the time, since the generator 1 does not yet generate power, the voltage detection signal D from the comparator 405 in the voltage regulator 4A is set to the low level.

Therefore, the output signal from the inverter circuit 501 in the smoothing circuit 5A is set to the high level and the transistor 502 is conducted.

At the time, since the voltage VC of the capacitor 503 has a zero potential and the comparator 702 in the comparison circuit 7A outputs the gradual increase control signal E of the low level, the signal output from the AND circuit 706 is set to the low level.

On the other hand, since the transistor 601 in the conducting time measurement circuit 6 is shut off by the voltage detection signal D of the low level, the capacitor 602 is charged by the constant power source A through the resistor 603.

Therefore, the voltage VC2 of the capacitor 602 input to the comparator 705 is larger than the reference voltage VR2 created by the constant power source A and the resistors 703, 704.

The circuit constant values of the capacitor 602 and the resistor 603 in the conducting time measurement circuit 6 are set such that the charging time constant of the capacitor 602 is made to 100 milliseconds. Further, the circuit constant values of the capacitor 602 and the resistor 603 as well as the resistance values of the resistors 703 and 704 in the gradual increase prohibition circuit 20 are set such that the charging time during which the voltage VC2 of the capacitor 602 reaches the reference voltage VR2 from the zero potential is made to a predetermined time (for example, 30 milliseconds).

As a result, since the voltage detection signal D of the low level and the low-level signal from the AND circuit 706 are input to the NOR circuit 406 in the voltage regulator 4, the signal output from the NOR circuit 406 is made to the high level.

Therefore, the transistor 407 is conducted and the field current IF flows to the field coil 102, so that the generator 1 is permitted to generate power.

Next, when the generator 1 starts power generation by the start-up of an internal combustion engine and the input level of the non-inverting input terminal (+) of the comparator 405 is made higher than the reference voltage VR, the voltage detection signal D is switched from the low level to the high level.

With this operation, since the high level signal is input to the input terminal of the NOR circuit 406, the output signal from the NOR circuit 406 is made to the low level and the transistor 407 is switched from the conducted state to a shut-off state.

At the time, the transistor 601 in the conducting time measurement circuit 6 is conducted in response to the voltage detection signal D of the high level to thereby instantly discharge the voltage VC of the capacitor 602 to the zero potential.

Therefore, the signal level on the non-inverting input terminal (+) side of the comparator 705 in the gradual increase prohibition circuit 20 is made lower than the reference voltage VR2 and the conducting signal F is made to the low level. With this operation, the low-level signal from the AND circuit 706 is imposed on one of the input terminals of the NOR circuit 406.

On the other hand, if the field current IF decreases to thereby drop the voltage generated by the generator 1 and the battery voltage and the input signal level of the comparator 405 in the voltage regulator 4A is made lower than the reference voltage VR, the voltage detection signal D is switched to the low level.

With this operation, the transistor 601 in the conducting time measurement circuit 6 is shut off and the capacitor 602 is charged.

However, since the predetermined time T during which the voltage VC2 of the capacitor 602 reaches the reference voltage VR2 is set to, for example, 30 millisecond, the conducting signal F from the gradual increase prohibition circuit 20 is maintained to the low level for 30 milliseconds.

Consequently, the signal output from the AND circuit 706 is maintained to the low level only for 30 milliseconds and at the time both of a pair of the input signals of the NOR circuit 406 are made to the low level.

As a result, the output signal from the NOR circuit 406 is switched to the high level, the transistor 407 is conducted to thereby increase the field current IF and the voltage generated by the generator 1.

As described above, the transistor 407 intermittently controls the field current IF by being intermittently and repeatedly turned on and off to thereby regulate the voltage generated by the generator 1 to a predetermined value.

At the time, since the inverter circuit 501 in the smoothing circuit 5A is operated in synchronism with the operation of the comparator 405 and intermittently operates the transistor 502, the capacitor 503 is charged to the voltage VC which is in proportion to the conducting ratio of the transistor 407.

Note, it is sufficient to set the predetermined time T to the range of about 20 milliseconds–50 milliseconds although it is different depending upon a required specification and a circuit specification.

Next, operation when the electric load 11 in FIG. 1 is turned on will be described with reference to the waveform view of FIG. 2.

Since the battery voltage VB is secured to a predetermined value when the generator 1 normally generates power, the comparator 405 outputs the voltage detection signal D of the high level which is switched to the low level through the NOR circuit 406 and shuts off the transistor 407.

At the time, since the transistor 601 in the conducting time measurement circuit 6 is conducted and the voltage VC of the capacitor 602 is discharged to the zero potential, the conducting signal F output from the comparator 705 is to the low level and the signal output from the AND circuit 706 is fixed to the low level.

Since the signal level on the non-inverting input terminal (+) side of the comparator 405 is made lower than the reference voltage VR when the electric load 11 is turned on by turning on the switch 12, the voltage detection signal D is made to the low level to thereby intend to increase the conducting ratio of the transistor 407 through the smoothing circuit 5A and the comparison circuit 7A.

However, since the voltage VC of the capacitor 602 in the conducting time measurement circuit 6 is not instantly charged even if the transistor 601 is shut off, the capacitor 602 is maintained in a state which is lower than the reference voltage VR2 for the predetermined time T (30 millisecond) and the comparator 705 outputs the conducting signal F of the low level at the time.

Therefore, since the AND circuit 706 outputs a low- level signal in response to the voltage detection signal D of the low level from the comparator 405 and the conducting signal F of the low level from the comparator 705, both the input signals of the NOR circuit 406 are made to the low level and the output signal from the NOR circuit 406 is made to the high level.

Figure 2:
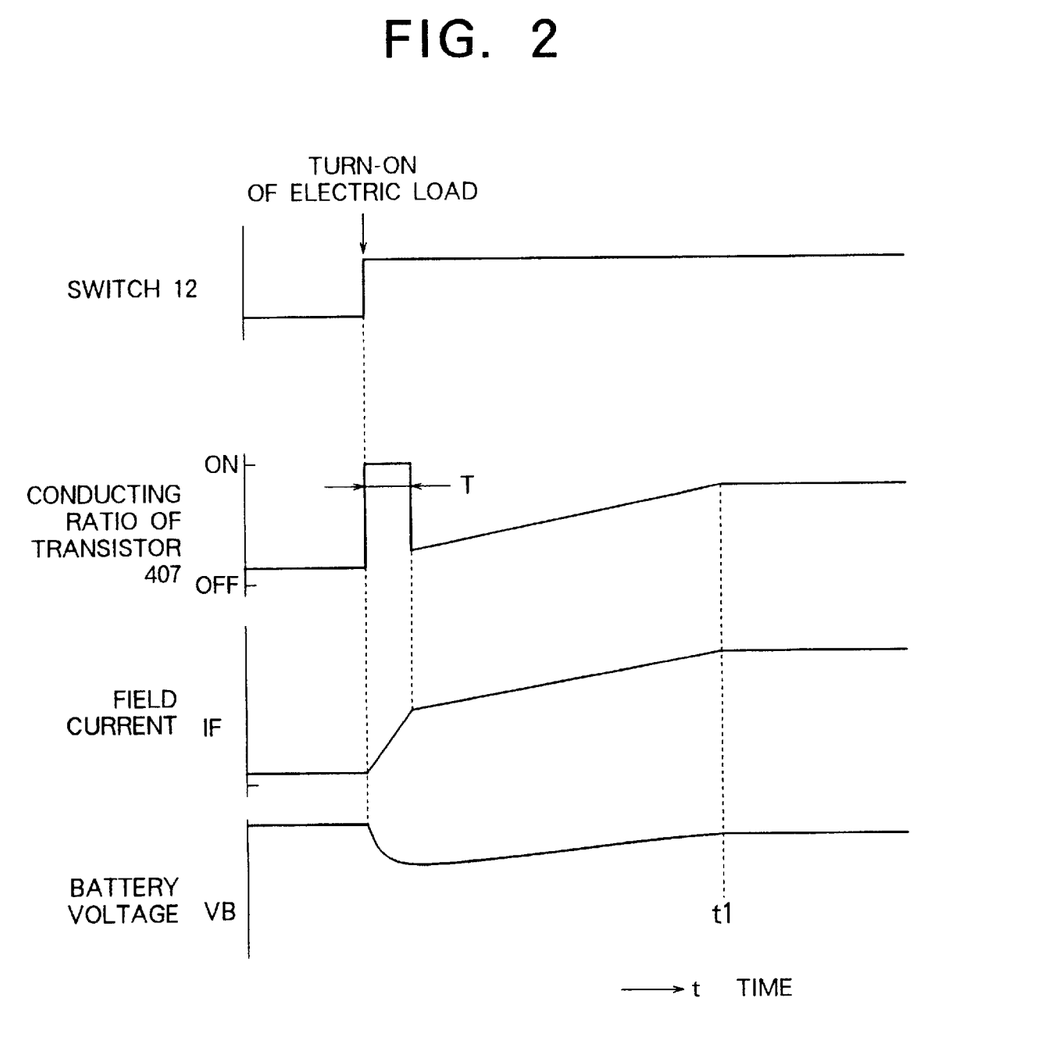

Consequently, the transistor 407 is conducted for the predetermined time (30 milliseconds, the conducting ratio is 100%) to thereby increase the field current IF by a duty of 100% as shown in FIG. 2.

With this operation, the drop of the battery voltage VB just after the electric load 11 is turned on is sufficiently suppressed.

Since the transistor 601 in the conducting time measurement circuit 6 is shut off for a long time when the electric load 11 is large and the voltage detection signal D exhibits the low level for a long time, the voltage VC2 of the capacitor 602 is gradually increased.

When the shut-off time of the transistor 601 exceeds the predetermined time T (30 milliseconds) and the voltage VC2 of the capacitor 602 is made higher than the reference voltage VR2, the conducting signal F from the comparator 705 is switched to the high level.

Therefore, the AND circuit 706 permits the gradual increase control signal E from the comparator 702 to pass as it is.

At the time, the output signal from the inverter circuit 501 in the smoothing circuit 5 is made to the high level in response to the voltage detection signal D of the low level, so that the transistor 502 is conducted to thereby intend to discharge the capacitor 503.

However, since the circuit constant values of the capacitor 503 and the resistors 504, 505 are set so as to make the discharging time constant of the capacitor 503 large (about a few seconds), the voltage VC of the capacitor 503 is not instantly discharged.

Therefore, the comparator 702, which compares the voltage VC of the capacitor 503 with a triangle voltage VT, operates to intermittently control the transistor 407 by conducting and shutting off it at a predetermined cycle in response to the gradual increase control signal E until the voltage generated by the generator 1 reaches the predetermined value.

At the time, the AND circuit 706 outputs the gradual increase control signal E from the comparator 702 as it is and the NOR circuit 406 outputs the signal which is obtained by inverting the output signal from the AND circuit 706.

Consequently, the transistor 407 controls the field current IF by intermittently controlling it based on the duty ratio as shown in FIG. 2 to thereby delay the generation of the output current from the generator 1 so as to sufficiently suppress a torque shock likewise the conventional apparatus.

Thereafter, the voltage detection signal D is made the high level at a time t1 when the current output from the generator 1 reaches a current value corresponding to the electric load 11 and the voltage output from the generator 1 reaches the predetermined value.

With this operation, the transistor 601 in the conducting time measurement circuit 6 is conducted, the voltage VC2 of the capacitor 602 is instantly made to the zero potential, the conducting signal F from the comparator 705 is made to the low level and the output signal from the AND circuit 706 is made to the low level.

Therefor, the transistor 407 is ordinarily controlled in accordance with the operation of the comparator 405.

As described above, since the conducting signal F is maintained to the low level for the predetermined time T and the gradual increase control signal E is made ineffective for the predetermined time T when the field current IF is increased by the turn-on of the electric load 11, the field current IF can be increased to the predetermined current at the conducting ratio of 100% likewise the apparatus in which the gradual increase control is not executed at the beginning of the control.

With this operation, since the insufficient charge of the battery 9 can be compensated by sufficiently securing the generated current and the drop of the battery voltage VB can be sufficiently suppressed, no comfortable feeling is applied to the driver.

Thereafter, the torque shock caused in response to the turn-on of the electric load 11 can be suppressed by gradually increasing the field current IF by setting the conducting signal F to the high level and making the gradual increase control signal E effective.

Embodiment 2

Note, although the conducting time measurement circuit 6 and the comparator 705 are used in the embodiment 1 to set the time for making the conducting ratio of the transistor 407 to 100% just after the electric load 11 is turned on, the time for making the conducting ratio of the transistor 407 to 100% may be set based on the increased amount of the field current.

Figure 3:
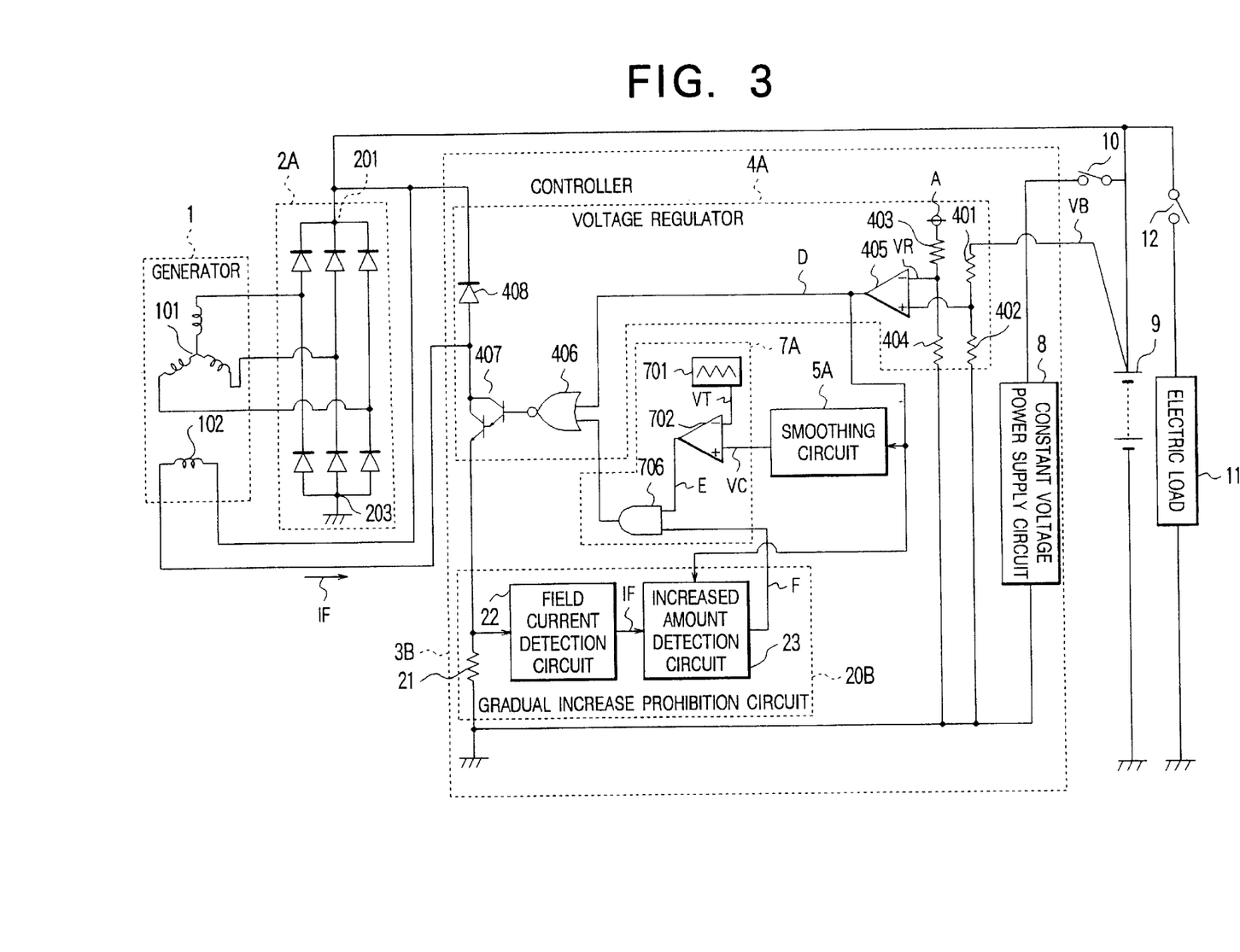
FIG. 3 is a circuit diagram showing an embodiment 2 of the present invention.

FIG. 3 is a circuit diagram showing an embodiment 2 of the present invention, wherein the same components as those mentioned above are denoted by the same numerals and the description thereof is not made in detail here.

In this case, a controller 3B includes a gradual increase prohibition circuit 20B (gradual increase urgent means) for determining a gradual increase control canceling period based on the increasing state of the field current IF, in addition to the voltage regulator 4A, the smoothing circuit 5A, the comparison circuit 7A and the constant voltage power supply circuit 8 which are mentioned above.

The gradual increase prohibition circuit 20B includes a resistor 21 inserted between the emitter of a transistor 407 and the ground, a field current detection circuit 22 connected to an end of the resistor 21 and an increased amount detection circuit 23 for outputting a conducting signal F based on a detected value If detected from the field current detection circuit 22.

The field current detection circuit 22 creates the detected value If which corresponds to the field current IF from the voltage value from the end of the resistor 21.

The increased amount detection circuit 23 maintains the conducting signal F to a low level in response to a voltage detection signal D of a low level and sets the conducting ratio of the transistor 407 to 100% and thereafter switches the conducting signal F to a high level when the increased amount of the detected value If from the field current detection circuit 22 exhibits a value larger than a predetermined value to thereby start the gradual increase control of the field current IF.

With this operation, when an electric load 11 is turned on, the gradual increase prohibition circuit 20B first sets the conducting ratio of the transistor 407 to 100% and detects that the field current IF has been increased by a predetermined value and thereafter the control of the field current IF is switched to the gradual increase control.

Therefore, the transistor 407 gradually increases the field current IF in response to the conducting signal F from the increased amount detection circuit 23.

As a result, the drop of a battery voltage VB which is caused when the electric load 11 is turned on can be sufficiently suppressed as well as a torque shock resulting from the turn-on of the electric load 11 can be sufficiently suppressed.

What is claimed is:

1. A vehicle generator controller for regulating a voltage output by a generator for charging a battery mounted on a vehicle, comprising:

battery voltage detection means for detecting the drop of the voltage of the battery;

a switching element for controlling the field current of the generator;

gradual increase control means for gradually increasing the field current by intermittently operating said switching element when the battery voltage is lowered to thereby gradually increasing the current generated by the generator; and gradual increase prohibition means for outputting a conducing signal for canceling the gradual increase control at the beginning of the drop of the battery voltage, wherein when the battery voltage drops, the conducting ratio of said switching element is set to 100% and thereafter the field current is gradually increased.

2. A vehicle generator controller according to claim 1, wherein said gradual increase prohibition means includes a conducting time measurement circuit for measuring the conducting time of the field current and gradually increases the field current after a predetermined time elapses from the time the conducting ratio of said switching element is set to 100%.

3. A vehicle generator controller according to claim 2, wherein said conducting time measurement circuit in said gradual increase prohibition means includes a time constant circuit for setting the predetermined time which is set to the range of 20 milliseconds to 50 milliseconds.

4. A vehicle generator controller according to claim 3, comprising a NOR circuit for opening and closing said switching element in response to the AND of the respective output signals from said battery voltage detection means and said gradual increase control means, wherein:

said battery voltage detection means includes a first comparator circuit for outputting a first level signal when the battery voltage drops below a first reference voltage;

said gradual increase control means includes a second comparator circuit having a smoothing circuit for gradually increasing the conducting ratio of said switching element in response to the first level signal from said first comparator circuit and an AND circuit for calculating the AND of the respective output signals from said second comparator circuit and said gradual increase prohibition means; and said gradual increase prohibition means includes a third comparator circuit for outputting a second level conducting signal when the output signal from said conducting time measurement circuit reaches a second reference voltage;

wherein the output signal from said conducting time measurement circuit moves to the second reference voltage according to the time constant of said time constant circuit in response to the first level signal from said first comparator circuit; and said third comparator circuit outputs a first level conducting signal over the predetermined time from the time when the battery voltage drops and sets the conducting ratio of said switching element to 100% through said NOR circuit by canceling the output signal from said second comparator through said NOR circuit.

5. A vehicle generator controller according to claim 1, wherein said gradual increase prohibition circuit includes:

a field current detection circuit for detecting the the field current; and an increased amount detection circuit for outputting the conducting signal as well as detecting an increased amount larger than the predetermined value of the field current; and when the battery voltage drops, said field current detection circuit detects that the field current has been increased by a predetermined value after the conducting ratio of said switching element is set to 100% and thereafter the field current is gradually increased.

6. A vehicle generator controller according to claim 5, wherein:

said increased amount detection circuit operates only when the battery voltage drops below the reference voltage and outputs the second level conducting signal when the increased amount of the field current reaches a value larger than the predetermined value after it maintains the conducting signal time interval to the first level; and said switching element increases the field current at the conducting ratio of 100% in response to the first level conducting signal and gradually increases the field current in response to the second level conducting signal.

* * * * *